(12) United States Patent
Bontempi et al.

(10) Patent No.: US 10,785,721 B1
(45) Date of Patent: Sep. 22, 2020

(54) ENERGY SAVING CONTROL OF MOBILE EQUIPMENT

(71) Applicant: INTERNATIONAL BUSINESS MACHINES CORPORATION, Armonk, NY (US)

(72) Inventors: Valerio Bontempi, Rome (IT); Crescenzo Migliaccio, Naples (IT); Simone Rutigliano, Terlizzi (IT); Gianluca Carugno, Rome (IT); Antonio Di Cocco, Rome (IT); Umberto Manganiello, Manocalzati (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/408,646

(22) Filed: May 10, 2019

(51) Int. Cl.
*H04W 52/02* (2009.01)
*H04M 15/00* (2006.01)

(52) U.S. Cl.
CPC ....... *H04W 52/0216* (2013.01); *H04M 15/58* (2013.01); *H04W 52/0229* (2013.01); *H04W 52/0254* (2013.01)

(58) Field of Classification Search
CPC .. Y02D 70/1262; Y02D 70/142; Y02D 70/00; Y02D 70/164; Y02D 70/144;
(Continued)

(56) References Cited

U.S. PATENT DOCUMENTS 10,098,036 B2  10/2018  Backholm
2002/0177475 A1*  11/2002  Park .................... H04W 52/027
455/574

(Continued)

FOREIGN PATENT DOCUMENTS

CN    103702401 B    8/2016
CN    102711182 B    9/2016

OTHER PUBLICATIONS

Yang et al., "Joint Optimization of Energy Consumption and Packet Scheduling for Mobile Edge Computing in Cyber-Physical Networks", IEEE Access, Special Section on Cyber-Physical-Social Computing and Networking, vol. 6, 2018, pp. 15576-15586.

(Continued)

*Primary Examiner* — Nimesh Patel
(74) *Attorney, Agent, or Firm* — Kenneth Han

(57) ABSTRACT

A method, computer program product, and network system for controlling an energy consumption of mobile equipment adapted to communicate over a telecommunication network are provided. The embodiment may include entering an energy saving mode for a mobile equipment in response to an energy saving activation. The embodiment may also include receiving inbound information to be transmitted to the mobile equipment in the energy saving mode. The embodiment may further include verifying a transmission enablement of the inbound information in response to said receiving the inbound information according to an energy saving policy based on one or more category indicators of the inbound information. The embodiment may also include controlling a transmission of the inbound information to the mobile equipment in the energy saving mode according to a result of said verifying the transmission enablement.

18 Claims, 9 Drawing Sheets

(58) Field of Classification Search
CPC .............. Y02D 70/24; Y02D 70/1224; Y02D 70/1242; Y02D 70/146; Y02D 70/1264; Y02D 70/166; Y02D 70/26; Y02D 70/21; Y02D 70/23; Y02D 70/1226; Y02D 10/174; Y02D 70/1244; Y02D 70/1246; Y02D 70/168; Y02D 70/25; Y02D 10/24; Y02D 70/22; Y02D 70/1222; Y02D 70/444; Y02D 30/30; Y02D 70/40; Y02D 70/42; Y02D 70/442; Y02D 70/124; Y02D 70/20; Y02D 10/153; Y02D 70/34; Y02D 70/162; Y02D 70/122; Y02D 10/128; Y02D 10/173; Y02D 70/12; Y02D 10/122; H04W 52/0212; H04W 52/0216; H04W 88/02; H04W 88/06; H04W 76/28; H04W 84/12; H04W 52/0277; H04W 72/042; H04W 52/265; H04W 72/082; H04W 72/10; H04W 72/12; H04W 28/08; H04W 72/08; H04W 72/1215; H04W 52/02; H04W 52/244; H04W 68/12; H04W 52/146; H04W 52/283; H04W 24/10; H04W 36/0055; H04W 52/0206; H04W 84/042; H04W 48/20; H04W 52/325; H04W 52/0261; H04W 52/367; H04W 28/0221; H04W 36/0069; H04W 4/023; H04W 52/221; H04W 52/241; H04W 52/346; H04W 68/005; H04W 28/0215; H04W 52/383; H04W 16/14; H04W 72/02; H04W 76/27; H04W 36/0022; H04W 72/048; H04W 76/16; H04W 68/00; H04W 52/343; H04W 52/365; H04W 52/30; H04W 52/028; H04W 52/0251; H04W 52/0254; H04W 52/08; H04W 72/1284; H04W 52/0225; H04W 72/085; H04W 8/245; H04W 92/18; H04W 52/0274; H04W 48/04; G06F 1/3212; G06F 21/6245; G06F 1/3265; G06F 1/329; G06F 15/16; G06F 1/3203; G06F 1/3209; G06F 1/3234; G06F 1/32; G06F 1/3206; G06F 16/9574; G06F 1/325; G06F 21/305; G06F 21/32; G06F 21/84; G06F 1/1694; G06F 3/0416; G06F 1/3237; G06F 1/324; G06F 1/3287; G06F 1/3231; G06F 1/3268; G06F 1/3293; G06F 3/016; H04L 43/16; H04L 67/104; H04L 12/6402; H04L 47/805; H04L 47/14; H04L 67/26; H04L 1/1812; H04L 12/1407; H04L 65/4084; H04L 41/5051; H04L 65/60; H04L 65/602; H04L 65/608; H04L 67/2842; H04L 67/22; H04L 65/1016; H04L 67/2838; H04L 67/303; H04L 67/306; H04L 1/0693; H04L 25/0248; H04L 27/2601; H04L 27/2646; H04L 27/2647; H04L 5/0025; H04L 5/0058; H04L 41/0645; H04L 51/14; H04L 51/38; H04L 41/0816; H04L 43/103; H04L 63/0272; H04L 63/1416; H04L 5/0098; H04L 5/0055; H04L 1/0026; H04L 5/0057; H04L 5/0037; H04L 5/0087; H04L 5/0035; H04L 5/0007; H04L 47/29; H04L 47/30; H04L 65/601; H04L 47/762; H04M 15/66; H04M 1/72519; H04M 15/55; H04M 1/72547; H04M 2250/06; H04B 2203/5408; H04B 17/336; H04B 1/10; H04B 1/1027; H04B 1/525; H04B 7/0404; H04B 7/0602; H04B 7/0617; H04B 7/0623; H04B 7/0689
See application file for complete search history.

(56) References Cited

U.S. PATENT DOCUMENTS

| | | | | |
|---|---|---|---|---|
| 2006/0234635 | A1* | 10/2006 | Riordan | G16H 40/67 455/67.11 |
| 2008/0082553 | A1* | 4/2008 | Wei | H04W 52/0235 |
| 2012/0297218 | A1* | 11/2012 | Hsiu | G06F 1/3265 713/320 |
| 2013/0301500 | A1* | 11/2013 | Koc | H04W 4/90 370/311 |
| 2014/0119255 | A1* | 5/2014 | Vannithamby | H04B 15/00 370/311 |
| 2015/0230179 | A1* | 8/2015 | Gupta | H04W 64/003 370/311 |
| 2015/0282070 | A1 | 10/2015 | Salem | |
| 2015/0282087 | A1* | 10/2015 | Yang | H04W 52/0261 370/311 |
| 2016/0198416 | A1* | 7/2016 | Li | H04W 52/283 370/311 |
| 2016/0262041 | A1* | 9/2016 | Ronneke | H04W 52/0216 |
| 2016/0323818 | A1* | 11/2016 | Senarath | H04W 52/0209 |
| 2017/0310768 | A1 | 10/2017 | Raleigh | |
| 2017/0339611 | A1* | 11/2017 | Landais | H04W 52/0216 |
| 2019/0104474 | A1* | 4/2019 | Raghunathan | H04W 76/27 |

OTHER PUBLICATIONS

Mell et al., "The NIST Definition of Cloud Computing," Recommendations of the National Institute of Standards and Technology, NIST Special Publication 800-145, Sep. 2011, pp. 1-7.

* cited by examiner

ENERGY SAVING CONTROL OF MOBILE EQUIPMENT

BACKGROUND

The present disclosure relates to the information technology field. More specifically, this disclosure relates to energy saving in mobile equipment.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Mobile equipment is commonly used to communicate while moving. Typical examples are mobile phones, which allow performing voice calls. In addition, modern mobile phones allow exchanging other types of information, such as text and/or multimedia messages. Most of the modern mobile phones are smartphones, which provide (multi-purpose) computing functionalities, comparable to the ones of standard computers; particularly, the smartphones support the execution of a wide range of software applications (commonly referred to as mobile apps, or simply apps), often involving access to the Internet. The mobile equipment allows performing corresponding activities (such as speaking, exchanging messages, accessing the Internet) almost everywhere. For this reason, the mobile equipment has become more and more popular, especially thanks to the widespread diffusion of the smartphones (which make many computing activities substantially ubiquitous).

The mobile equipment communicates over a telecommunication network (for example, a mobile telephone network for the smartphones). Because of their nomadic nature, the mobile equipment accesses the telecommunication network via wireless connections (for example, of 3G/4G type for the smartphones). For the same reason, the mobile equipment is quite small and light, and they are supplied by batteries.

The batteries are charged by applying electric current, generally provided by connecting the mobile equipment to the electric main via battery chargers. Once charged, the batteries may supply the mobile equipment for a length of time which is intrinsically limited. For example, lifetimes of the batteries (during which the batteries being fully charged may supply the mobile equipment) are typically of some tens of hours. Therefore, the batteries are to be recharged continually to allow using the mobile equipment. Otherwise, once the batteries are completely discharged, the mobile equipment turn off. However, in some situations it may be difficult, if not impossible, to recharge the batteries timely (for example, when travelling for a long period); in this case, a risk exists of becoming unable to use the mobile equipment (until their batteries are recharged). This is especially true for the smartphones, which have to handle heavy energy consumption requirements of their components (such as microprocessors and displays) and services (such as navigation apps and social apps).

In order to extend the lifetimes of the batteries, users of the mobile equipment may reduce an energy consumption of the mobile equipment by disabling some of their functionalities.

However, the identification by the users of the functionalities which are most energy consuming is quite challenging. Moreover, this is a completely manual activity which is time consuming and annoying. As a consequence, the users are likely to make mistakes in the identification of the functionalities to be disabled. The users might then select functionalities which are substantially ineffective in reducing the energy consumption (thereby degrading operation of the mobile equipment without any noticeable extension of the lifetimes of the batteries) or vice-versa the users might miss functionalities which would be actually effective in reducing the energy consumption (thereby failing to extend the lifetimes of the batteries).

Furthermore, it is quite difficult for the users to remember the functionalities which have been disabled and then are to be re-enabled once the batteries have been recharged. As a consequence, a risk exists that the users might forget to re-enable some of the functionalities which had been disabled; in this case, the forgotten functionalities remain disabled with a corresponding degradation of the operation of the mobile equipment. This situation may persist for a relatively long time (until the users appreciate the degradation), with the identification of the disabled functionalities causing it that become more and more difficult as the time elapsed from their disabling increases.

In any case, in several situations it is not possible to disable specific functionalities of the mobile equipment. This happens when the corresponding degradation of the operation of the mobile equipment would be unacceptable for the users.

All of the above makes it quite difficult to balance the opposed requirements of long lifetimes of the batteries and effective operation of the mobile equipment.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of controlling a transmission of information to the mobile equipment selectively.

Particularly, an embodiment provides a method for controlling an energy consumption of mobile equipment adapted to communicate over a telecommunication network. The method comprises controlling (by a network system of the telecommunication network) a transmission of inbound information, to be transmitted to a mobile equipment in an energy saving mode, according to a corresponding transmission enablement. The transmission enablement is determined according to an energy saving policy based on one or more category indicators of the inbound information.

A further aspect provides a computer program for implementing the method.

A further aspect provides a corresponding computer program product.

A further aspect provides a corresponding network system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

DETAILED DESCRIPTION

With reference in particular to FIG. 1A-FIG. 1D, an example is shown of application of the solution according to an embodiment of the present disclosure.

Figure 1A:
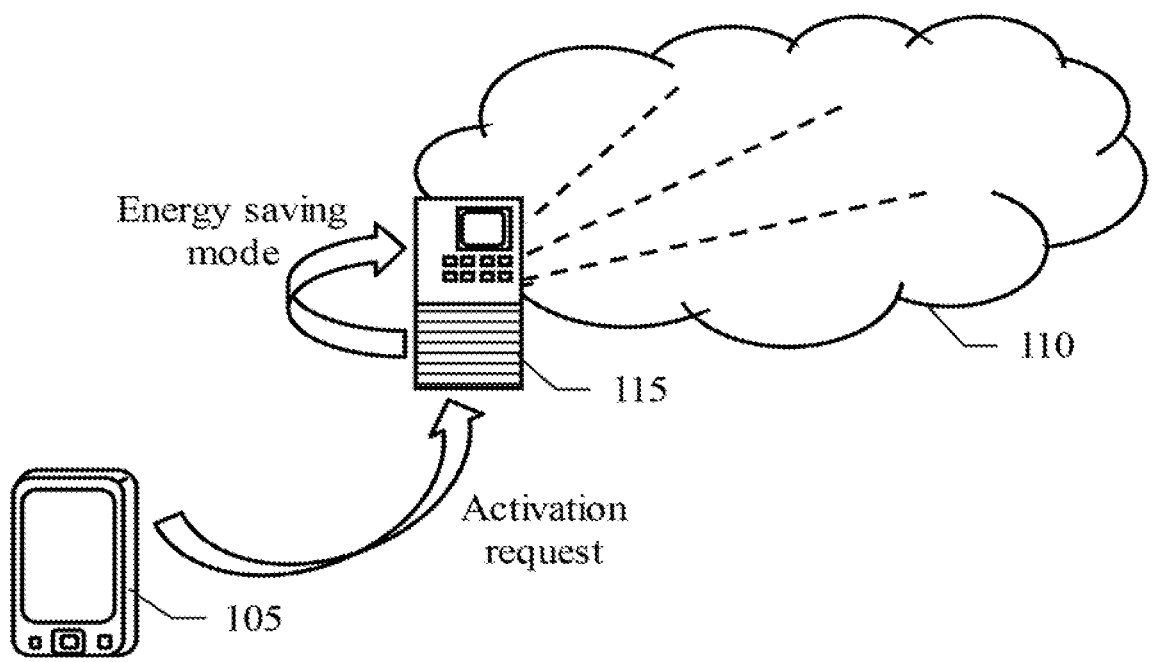
FIG. 1A-FIG. 1D show an example of application of the solution according to an embodiment of the present disclosure.

Starting from FIG. 1A, one or more mobile (computing) equipment 105, only one shown in the figure, are used to communicate over a telecommunication network 110 by corresponding users. A network (computing) system 115 of the telecommunication network 110 enters an energy saving mode for the mobile equipment 105 in response to an energy saving activation (for example, an activation request received from the mobile equipment 105).

Figure 1B:
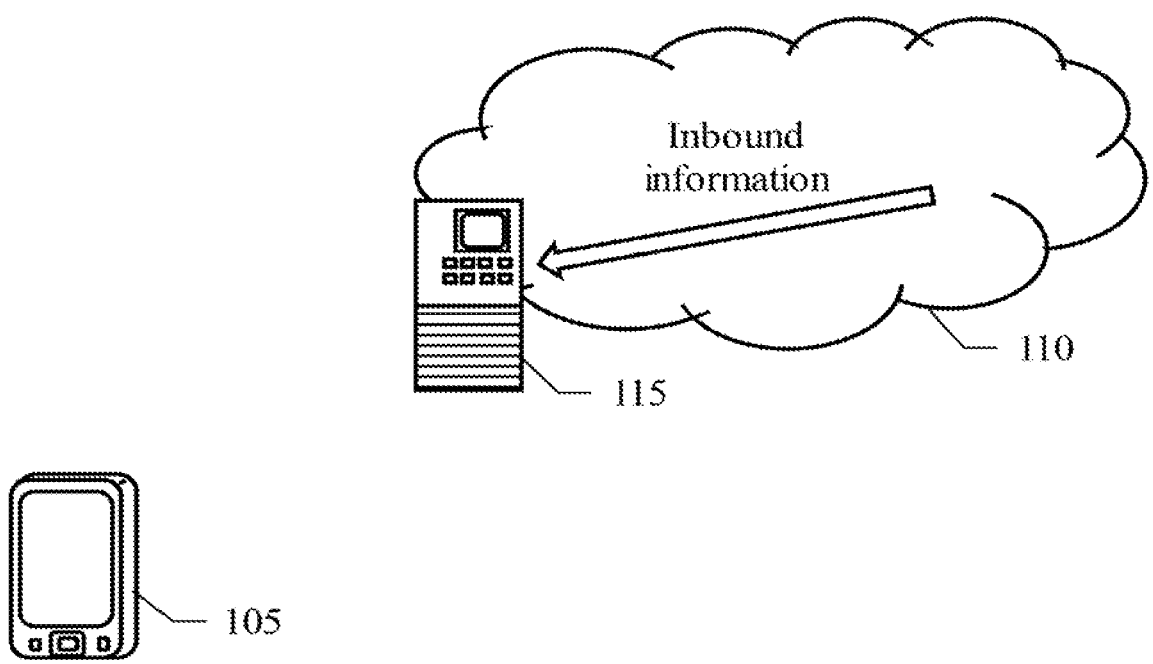

Moving to FIG. 1B, the network system 115 receives, over the telecommunication network 110, (inbound) information to be transmitted to the mobile equipment 105 in the energy saving mode. For example, the inbound information is a (voice) call or a (text/multimedia) message addressed to a telephone number of the mobile equipment 105, data to be downloaded to the mobile equipment 105 and so on.

Figure 1C:
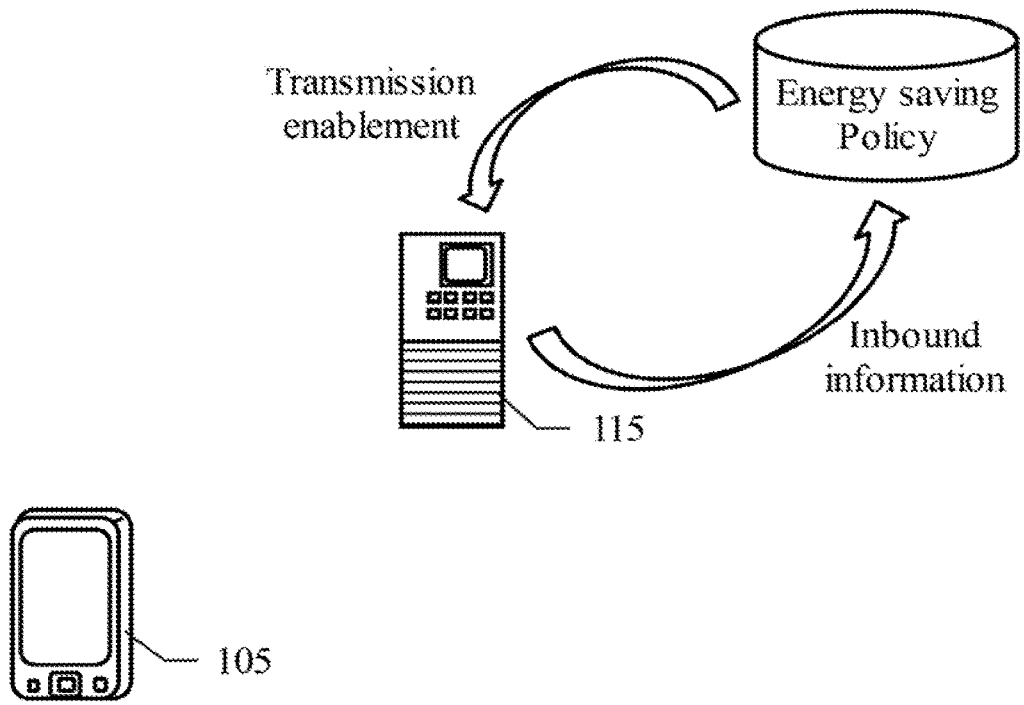

Moving to FIG. 1C, in response thereto the network system 115 verifies a transmission enablement of the inbound information for the mobile equipment 105 (in the energy saving mode). The transmission enablement is verified according to an energy saving policy of the mobile equipment 105, which is based on one or more category indicators of the inbound information. For example, for this purpose an information category of the inbound information (defined by one or more category parameters thereof) is searched in a blocking list of the energy saving policy.

Figure 1D:
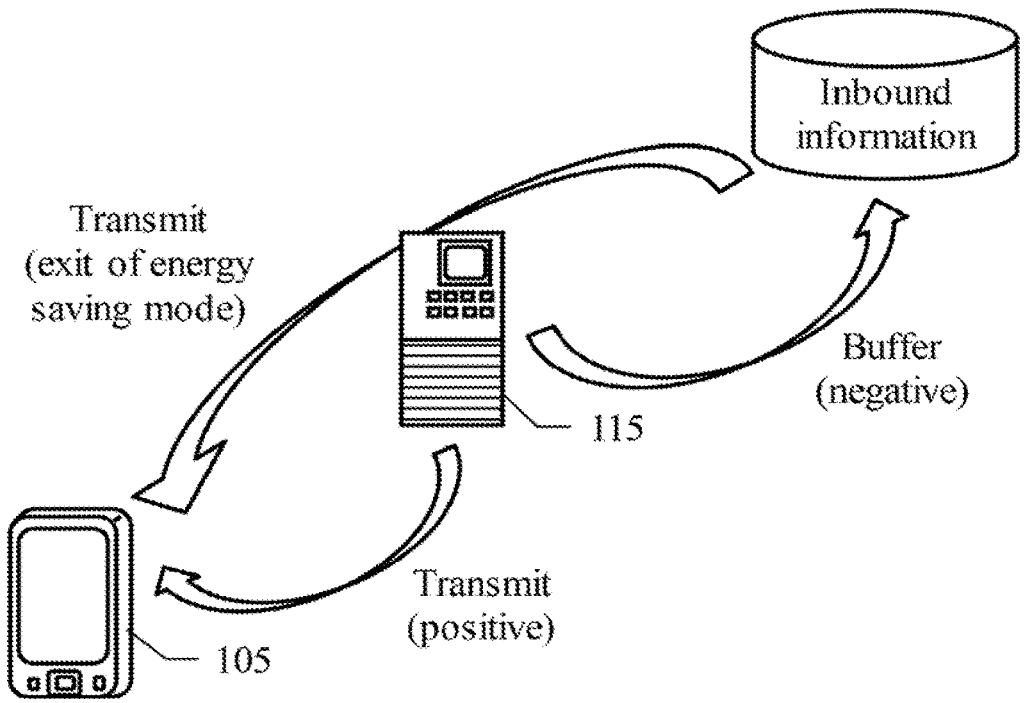

Moving to FIG. 1D, the network system 115 controls a transmission of the inbound information to the mobile equipment 105 (in the energy saving mode) according to a result of the verification of the transmission enablement. For example, when the result of the verification is positive (such as the information category of the inbound information is not found in the blocking list) the network system 115 transmits the inbound information to the mobile equipment 105 as usual. Conversely, when the result of the verification is negative (such as the information category of the inbound information is found in the blocking list) the network system 115 buffers the inbound information for their transmission to the mobile equipment 105 only when the mobile equipment 105 exits the energy saving mode.

The above-described solution allows optimizing the energy consumption of the mobile equipment 105.

This result is achieved with no (or at least limited) intervention of the user of the mobile equipment 105. Particularly, the transmission of the inbound information to the mobile equipment 105 is controlled automatically according to the energy saving policy. The energy saving policy may be adapted to suit the user's needs very efficiently (for example, by applying cognitive techniques).

The energy consumption of the mobile equipment 105 is reduced without adversely affecting operation of the mobile equipment 105, but simply preventing (at least temporarily) the transmission thereto of inbound information which is deemed to be less important (so that its receipt by the user of the mobile equipment 105 may be postponed without causing any significant problem).

The verification of the transmission enablement by the network system 115 relieves the mobile equipment 105 from the corresponding operations. As a result, for any inbound information which is not transmitted immediately to the mobile equipment 105 a corresponding net energy saving is obtained (since no energy consumption is caused to the mobile equipment 105 for the verification of the transmission enablement of the inbound information).

Figure 2:
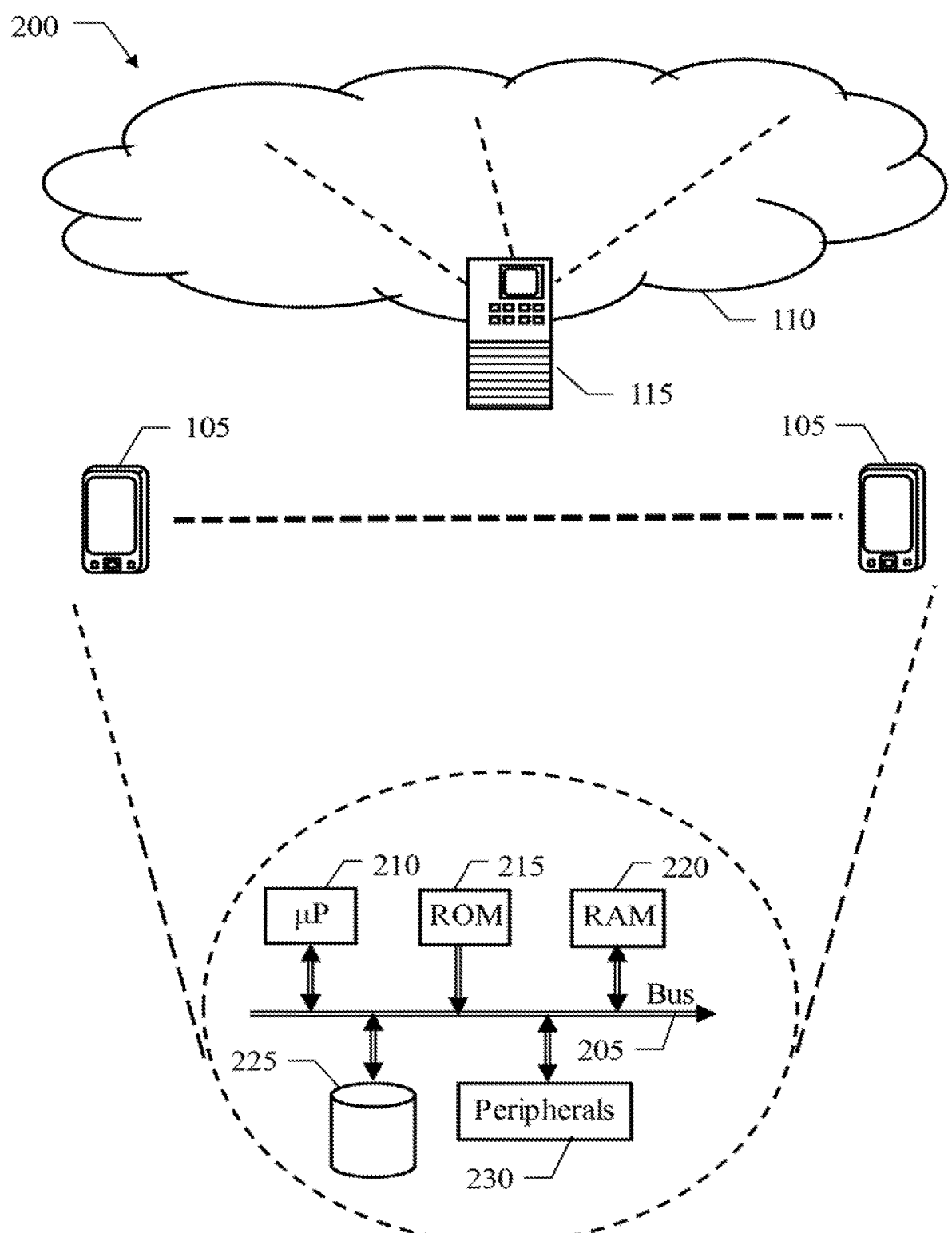
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced.

The computing infrastructure 200 comprises the mobile equipment 105, the telecommunication network 110 and its network system 115. For example, the mobile equipment 105 are smart-phones, which may be used to perform (voice) calls, send/receive (text/multimedia) messages, upload/download data, run apps and so on. The telecommunication network 110 is a mobile telephone network (of cellular type), which allows the users of the mobile equipment 105 to exploit services offered by their mobile telephone operators (for example, calls, messages and data) and/or in the Internet. The mobile equipment 105 access the communication network 110 by connecting to radio stations thereof which define corresponding cells of the communication network 110 or to access points (for example, of the Wi-Fi type) which provide access to the Internet over a public telephone network (not shown in the figure). The network system 115 is distributed among a plurality of switching servers which are connected between corresponding radio stations and the public telephone network to switch (i.e., route) information over the telecommunication network 110 to and from the mobile equipment 105.

Each one of the above-described computing machines (i.e., mobile equipment 105 and network system 115) comprises several units which are connected among them through a bus structure 205 with one or more levels (with an architecture which is suitably scaled according to the type of the computing machine 105,115). Particularly, one or more microprocessors (µP) 210 control operation of the computing machine 105,115; a non-volatile memory (ROM) 215 stores basic code for a bootstrap of the computing machine 105,115 and a volatile memory (RAM) 220 is used as a working memory by the microprocessors 210. The computing machine 105,115 is provided with a mass-memory 225 for storing programs and data (for example, a flash E2PROM for each mobile equipment 105 and storage devices of one or more data centers wherein the switching servers of the network system 115 are implemented). Moreover, the computing machine 105,115 comprises a number of controllers for peripherals, or Input/Output (I/O) units, 230; for example, the peripherals 230 of each mobile equipment 105 comprise a mobile telephone transceiver (TX/RX) for communicating over the mobile telephone network, a Wireless Network Interface Card (WNIC) for communicating with the access points and a touchscreen for entering commands/information and for displaying information, whereas the peripherals 230 of each switching server of the network system 115 comprise a Network Interface Card (NIC) for plugging it into the corresponding data center and then connecting to a console of the data center (for example, a personal computer, also provided with a drive for reading/writing removable storage units, such as optical disks like DVDs) and to a switch/router sub-system of the data center for its communication over the telecommunication network 110.

Figure 3:
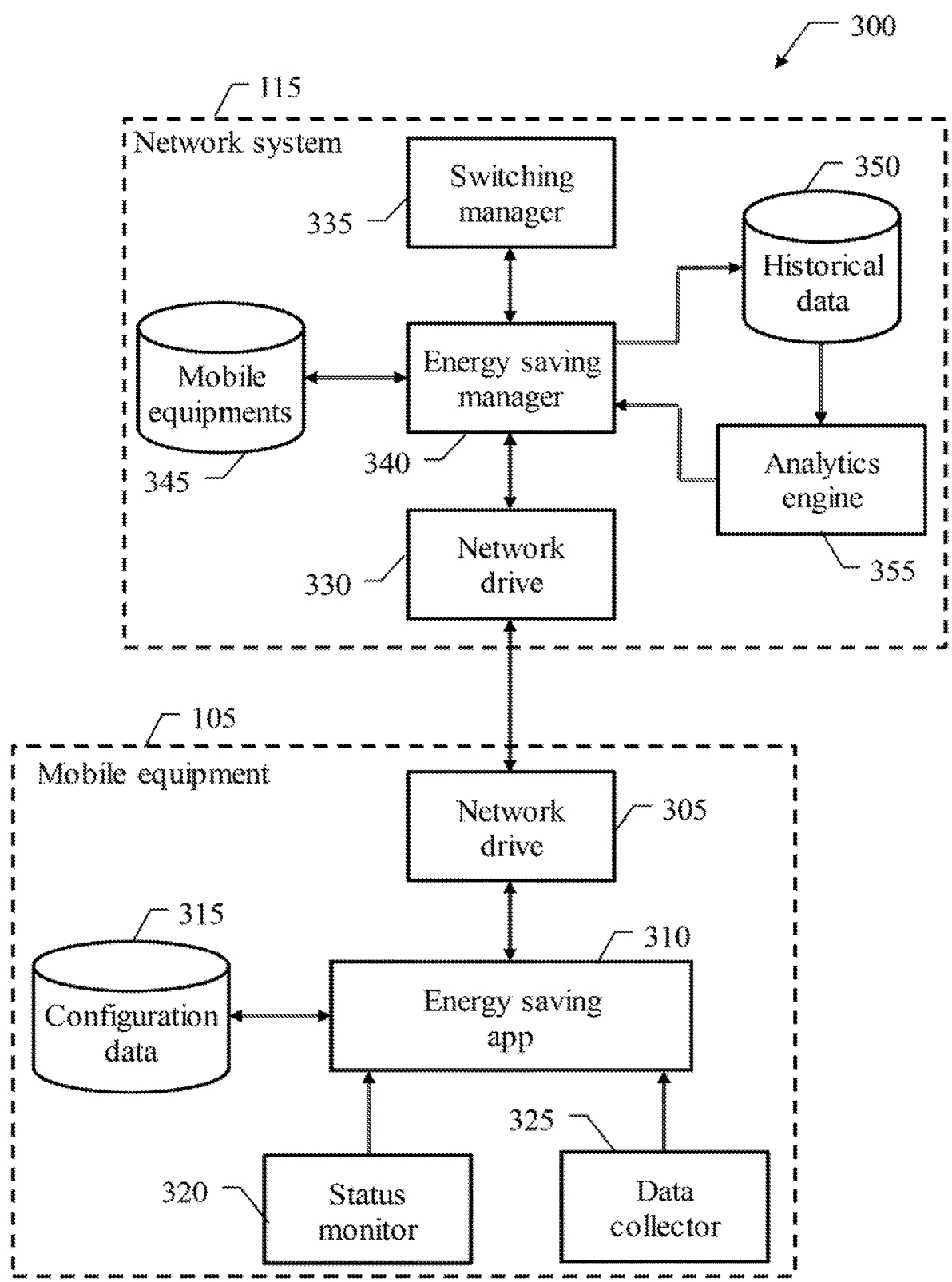
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components 300 are typically stored in the mass memory and loaded (at least in part) into the working memory of each computing machine 105,115 when the programs are running. The programs are initially installed into the mass memory, for example, from removable storage units or from the telecommunication network (not shown in the figure). In this respect, each program may be a module, segment or portion of code, which comprises one or more executable instructions for implementing the specified logical function.

Starting from each mobile equipment 105 (only one shown in the figure), it comprises the following software components.

A network drive 305, cumulatively representing both a transceiver drive (driving the mobile telephone transceiver) and a WNIC drive (driving the WNIC), is used to communicate over the telecommunication network; particularly, as far as relevant to the present disclosure, the network drive 305 is used to receive the inbound information (addressed to the mobile equipment 105) and to interact with the network system 115.

In the solution according to an embodiment of the present disclosure, the network drive 105 interacts with an energy saving app 310. The energy saving app 310 is used to control the energy saving of the mobile equipment 105. For this purpose, the energy saving app 310 exposes a user interface for configuring the energy saving of the mobile equipment 105. The energy saving app 310 accesses (in read/write mode) a configuration data repository 315. The configuration data repository 315 stores (local) configuration data of the mobile equipment 105. The configuration data comprises an energy saving policy and customization data of the mobile equipment 105. The energy saving policy has one or more entries for corresponding (energy saving) levels of the energy saving mode (for example, moderate, high and very high). Each entry stores an activation condition (determining the entering/exiting of the energy saving mode at the energy saving level) and a blocking condition (determining the inbound information whose transmission to the mobile equipment 105 is to be blocked when the mobile equipment 105 is in the energy saving mode at the energy saving level). The activation condition depends on a status of the mobile equipment 105; for example, the status is indicated by one or more status parameters thereof (such as battery level, outside temperature, time, date and/or geographical zone). The activation condition may be defined by a single status parameter reaching a certain threshold or by a combination (with logical operators, such as AND, OR, XOR, NOT) of two or more status parameters reaching corresponding thresholds. Typical examples of the activation condition are the battery level lower than a threshold, the battery level lower than a threshold and the outside temperature lower than another threshold, the battery level lower than a threshold and the current time/date within a range, and so on. The blocking condition depends on (information) categories of the inbound information. For example, each information category is defined by one or more category parameters (such as type like call, message or data, nature like personal, business, commercial, entertainment or emergency, caller/sender, message/data size and/or related app); particularly, it is possible to define the information category by a single category parameter having a certain value or by a combination (with logical operators, such has AND, OR, XOR, NOT) of two or more category parameters having corresponding values. The blocking condition may be defined by a blocking list of information categories; for each information category in the blocking list, the transmission to the mobile equipment 105 of the inbound information belonging to the information category is to be blocked when the mobile equipment 105 is in the energy saving mode at the energy saving level. Typical examples of the blocking list are all the calls, the calls from specific callers, all the messages, the messages from specific senders, all the data, the data relating to specific apps and so on. The customization data indicate specific information categories of the inbound information (defined as above) whose transmission to the mobile equipment in the energy saving mode (at one or more energy saving levels) is always to be blocked (such as for inbound information of commercial nature) or is never to be blocked (such as for inbound information of business/emergency nature).

The energy saving app 310 exploits a status monitor 320. The status monitors 320 monitors the status parameters of the mobile equipment 105. Moreover, the energy saving app 310 exploits a data collector 325. The data collector 325 collects historical data, comprising energy consumption data and behavioral data, relating to communication events which have involved the transmission of (transmitted) information from the network system 115 to the mobile equipment 105. Each communication event is identified by the information category of the transmitted information (defined as above). The energy consumption data of the communication event relate to its energy consumption impact on the mobile equipment 105. For example, the energy consumption data indicates an amount of energy which has been consumed during the receipt of the transmitted information, its duration, a frequency of similar communication events and so on. The behavioral data of the communication event relate to a behavior of the user of the mobile equipment 105 with respect thereto. For example, the behavioral data indicates whether the user has accepted/refused a call, a time elapsed from the receipt of a message to its reading, a time elapsed from the receipt of data to their use, whether the user has responded to a message and so on.

Moving to the network system 115, it comprises the following software components.

A network drive 330 drives the NIC; particularly, as far as relevant to the present disclosure, the network drive 330 is used to transmit the inbound information to the mobile equipment 105 and to interact with them. A switching manager 335 routes the information over the telecommunication network, and particularly to and from the mobile equipment 105.

In the solution according to an embodiment of the present disclosure, an energy saving manager 340 is interposed between the switching manager 335 and the network drive 330. The energy saving manager 340 manages the energy saving of the mobile equipment 105. The energy saving manager 340 accesses (in read/write mode) a mobile equipment repository 345. The mobile equipment repository 345 stores (global) operative information of all the mobile equipment 105. The mobile equipment repository 345 comprises an entry for each mobile equipment 105 (identified by a corresponding unique identifier, for example, an IMSI of its USIM). The entry stores a (current) mode indicator of the mobile equipment 105 (i.e., energy saving mode at a specific energy saving level or standard mode otherwise), its energy saving policy and customization data, any pieces of inbound information (addressed to the mobile equipment) which have been buffered, log data and feedback data. The log data indicates energy saving activities which have been performed for the mobile equipment. For example, the log data may indicate every change of the mode of the mobile equipment and the inbound information which have been blocked/transmitted with the mobile equipment in the energy saving mode. The feedback date indicates a feedback of the user of the mobile equipment to the energy saving activities which have been performed in respect thereto. For example, the feedback data may indicate a perceived effectiveness of the energy saving activities in actually reducing the energy consumption of the mobile equipment (such as by an effectiveness index), with or without an indication of selected pieces of inbound information whose transmission/blockage has not been deemed satisfactory. The energy saving manager 340 accesses (in read/write mode) a historical data repository 350. The historical data repository 350 stores the historical data which have been collected by the mobile equipment 105. The energy saving manager 340 exploits an analytics engine 355, which accesses (in read mode) the historical data repository 350. The analytics engine 355 applies analytics techniques to determine analytics data representing typical patterns of the historical data, at the level of either all the mobile equipment 105 (globally) or each mobile equipment 105 (individually). The analytics data relate to information categories of (homogenous) transmitted information of the communication events (defined as above). For each information category, the analytics data are representative of the historical data of all the communication events of that information category.

Figure 4A:
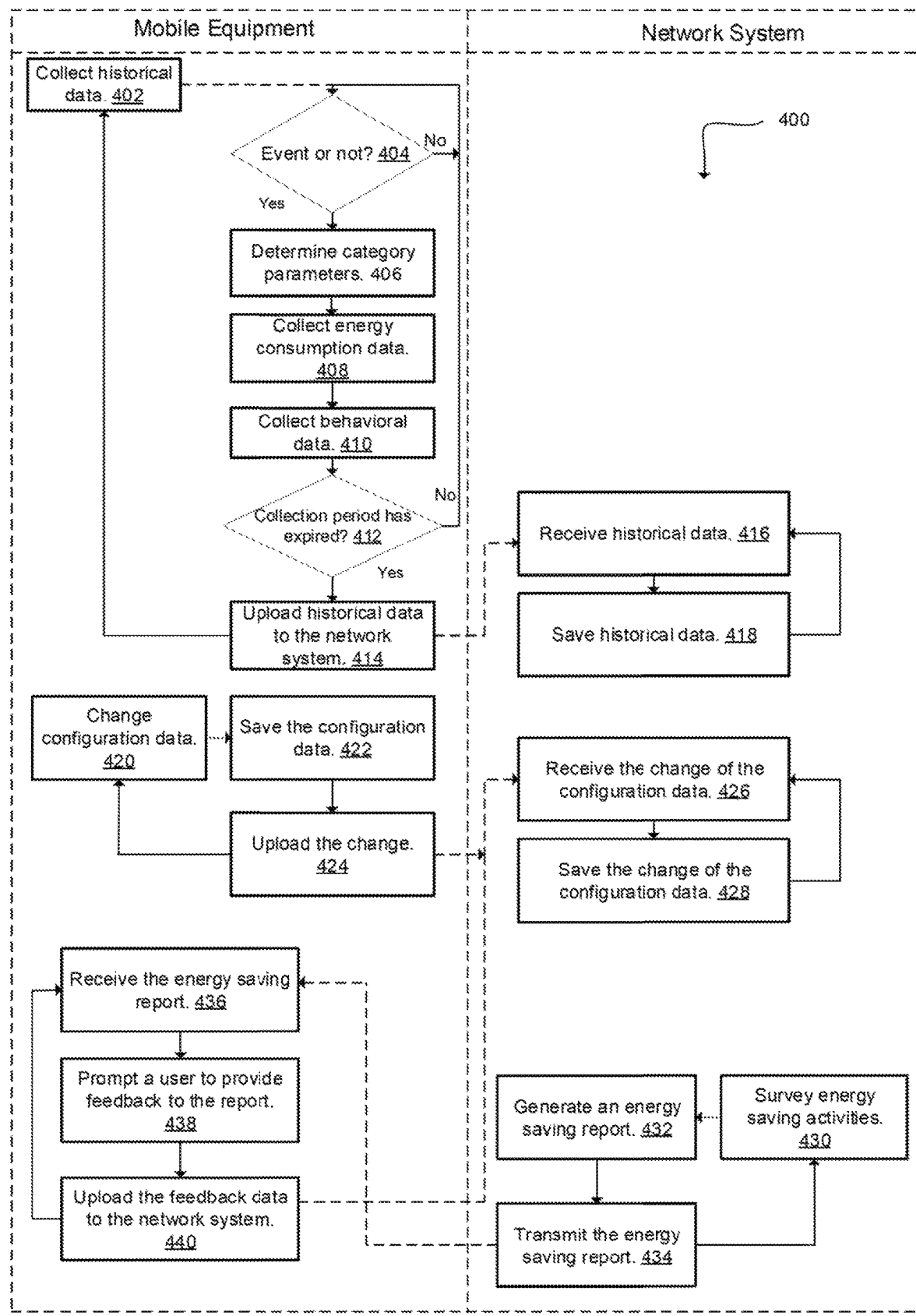
FIG. 4A-FIG. 4C show an activity diagram describing the flow of activities relating to an implementation of the solution according to an embodiment of the present disclosure.
Figure 4B:
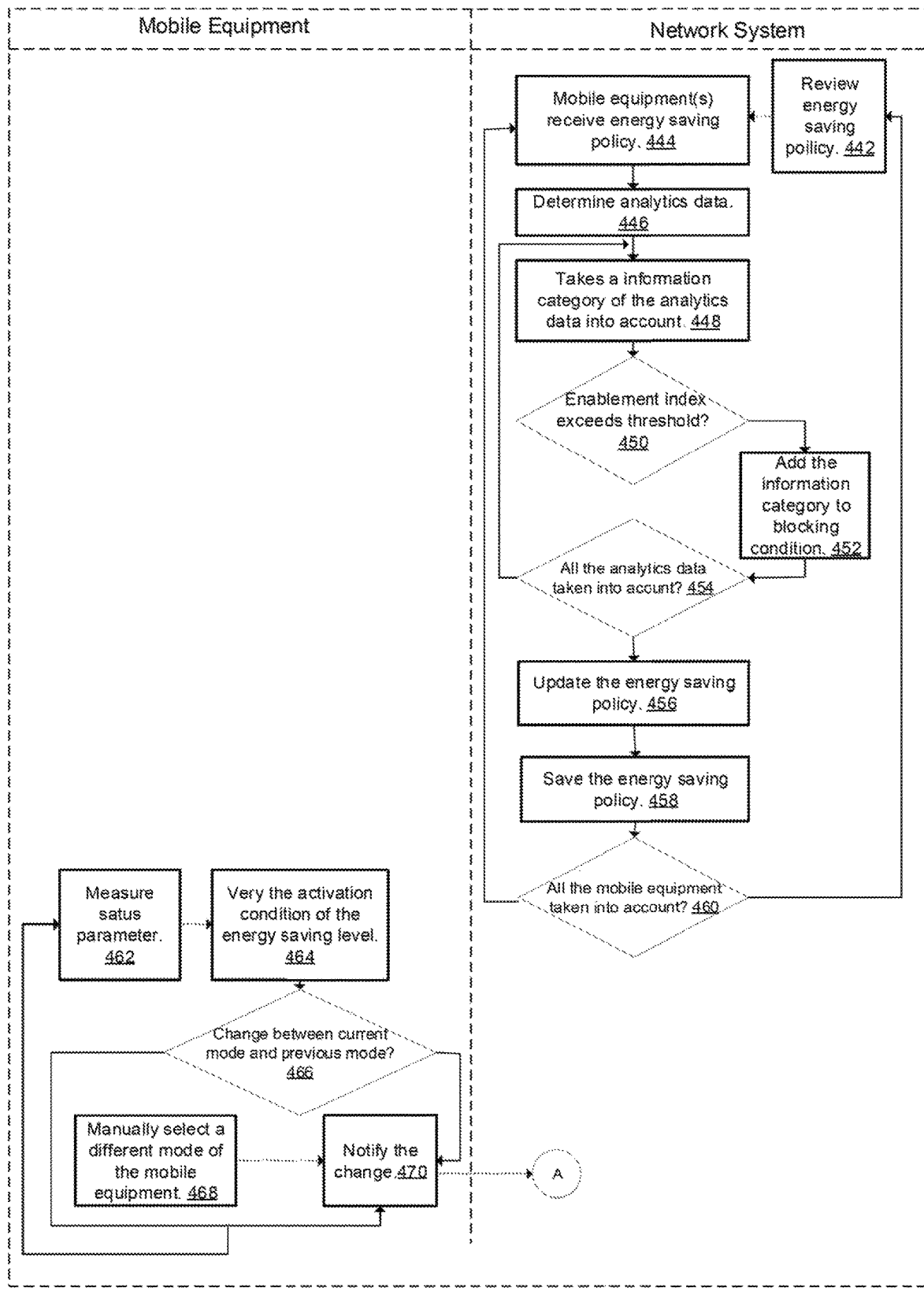
Figure 4C:
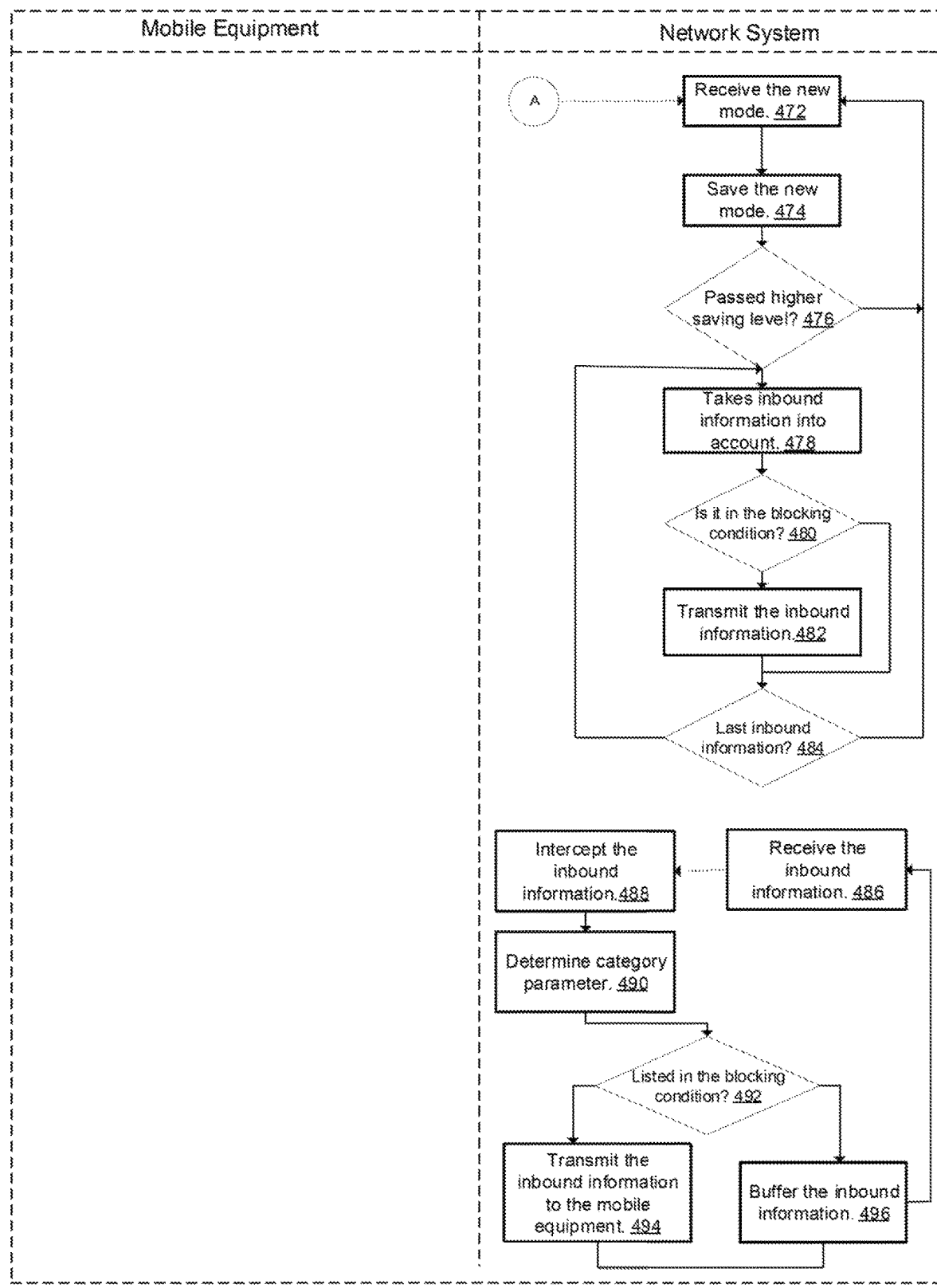

With reference now to FIG. 4A-FIG. 4C, an activity diagram is shown describing the flow of activities relating to an implementation of the solution according to an embodiment of the present disclosure.

Particularly, the activity diagram represents an exemplary process that may be used to control an energy saving of the mobile equipment with a method 400. In this respect, each block may correspond to one or more executable instructions for implementing the specified logical function on the corresponding computing machine.

Starting from the swim-lane of a generic mobile equipment, the process passes from block 402 to block 404 as soon as an event occurs triggering the collection of the historical data on the mobile equipment. For example, this may happen at the beginning to initialize the mobile equipment and later one periodically, with a collection frequency which may be either fixed or variable (the higher the variability of the historical data the higher the collection frequency, such as from every 1-4 days to every 1-4 weeks). As a result, the historical data may be maintained sufficiently up-to-date, but without an excessive overhead of the mobile equipment. In response thereto, the data collector enters an idle loop waiting for any (new) communication event. As soon as any communication event is detected, the data collector collects its historical data. Particularly, the data collector at block 406 determines the category parameters of the corresponding transmitted information. The data collector at block 408 collects the energy consumption data of the communication event. The data collector at block 410 collects the behavioral data of the communication event. In all cases, the historical data (i.e., the category parameters, the energy consumption data and the behavioral data) may be determined at the start of the communication event (for example, type, nature, caller/sender and/or related app), at the end of the communication event (for example, message/data size, consumed energy, duration, accepted/refused call) or even later on (for example, elapsed time between receipt and reading of message, elapsed time between receipt and use of data and/or possible response to message). A test is made at block 412, wherein the data collector verifies whether a pre-defined collection period, from the triggering of the collection of the historical data, has expired (for example, 4-12 hours). If not, the process returns to the block 404 waiting for a next communication event. Conversely, the process descends into block 414, wherein the energy saving app uploads (via the network drive) the historical data (provided by the data collector) to the network system. The process then returns to the block 402 waiting for a next triggering of the collection of the historical data.

Moving to the swim-lane of the network system, the energy saving manager at block 416 receives (via the network drive) the historical data from any mobile equipment. In response thereto, the energy saving manager at block 418 saves the historical data into the corresponding entry of the mobile equipment data repository. The process then returns to the block 416 waiting for a next upload of the historical data from any mobile equipment.

With reference again to the swim-lane of the mobile equipment, in a completely independent way the process passes from block 420 to block 422 whenever the user applies any change to the (local) configuration data, including a complete reset thereof to default values (via the user interface of the energy saving app). For example, the user may enable/disable any energy saving levels of the energy saving mode, may update the activation conditions of the energy saving policy and/or may update the customization data. In response thereto, the energy saving app saves the change of the configuration data into the configuration data repository. The energy saving app at block 424 uploads (via the network drive) the change of the configuration data to the network system. The process then returns to the block 420 waiting for a next change of the configuration data.

Moving to the swim-lane of the network system, the energy saving manager at block 426 receives (via the network drive) the change of the configuration data from any mobile equipment. In response thereto, the energy saving manager at block 428 saves the change of the configuration data into the corresponding entry of the mobile equipment repository. The process then returns to the block 426 waiting for a next upload of a change of the customization data from any mobile equipment.

Remaining in the swim-lane of the network system, in a completely independent way the process passes from block 430 to block 432 as soon as an event occurs triggering a survey of the energy saving activities of any mobile equipment. For example, this may happen periodically, after a pre-determined time has been spent by the mobile equipment in the energy saving mode, after a pre-determined number of pieces of inbound information have been blocked for the mobile equipment and so on. In response thereto, the energy saving manager at block 432 generates an (energy saving) report for the mobile equipment. The energy saving report is based on the log data for the mobile equipment (extracted from the corresponding entry of the mobile equipment repository) from a previous survey relating thereto up to now. The energy saving manager at block 434 transmits (via the network drive) the energy saving report to the mobile equipment. The process then returns to the block 430 waiting for a next triggering of the survey of the energy saving activities of any mobile equipment.

Moving to the swim-lane of the mobile equipment, the energy saving app at block 436 receives (via the network drive) the energy saving report. In response thereto, the energy saving app at block 438 prompts the user of the mobile equipment to provide his/her feedback to the energy saving report. The energy saving app at block 440 uploads (via the network drive) the corresponding feedback data (if any) to the network system (wherein it is received and saved into the corresponding entry of the mobile equipment repository by repeating the same operations described above at the blocks 426-428). The process then returns to the block 436 waiting for a next energy saving report.

Returning to the swim-lane of the network system, in a completely independent way the process passes from block 442 to block 444 as soon as an event occurs triggering the review of the energy saving policies. For example, this may happen for all the mobile equipment after energy saving data have been received in a pre-defined amount or from a pre-defined number of mobile equipment, for a specific mobile equipment after a predetermined amount of behavioral data thereof have been received or immediately as soon as an update of its customization data and/or feedback data have been received. In response thereto, a loop is entered for reviewing the energy saving policies of the (relevant) mobile equipment. For this purpose, the energy saving manager exploits pre-defined enablement rules (initialized to default values with the possibility of configuring them via a user interface of the energy saving manager). The enablement rules define an enablement function for calculating an enablement index of the information categories (according to their category parameters). Moreover, the enablement rules define any desired number of energy saving levels (of the energy saving mode); for each energy saving level, the enablement rules indicates a corresponding enablement threshold for the enablement index. Particularly, the loop begins with the energy saving manager that takes a current (relevant) mobile equipment into account (stating from a first one in any arbitrary order). If necessary, the energy saving manager at block 446 commands the analytics engine to determine the analytics data from the (relevant) historical data relating to the (current) mobile equipment (comprising all the energy consumption data and the corresponding behavioral data). For example, the analytics engine discovers the information categories of the (relevant) communication events involving a similar energy consumption impact and/or a similar user's behavior (such as within corresponding ranges). For each information category of the historical data, the analytics engine determines its analytics data (for example, set to a weighted average of the corresponding historical data). The energy saving manager at block 448 takes a (current) information category of the analytics data into account (stating from a first one in any arbitrary order), and then calculates the corresponding enablement index (by applying its category parameters to the enablement function). The flow of activity branches at block 450 according to a comparison of the enablement index with the enablement thresholds of the different energy saving levels. If the enablement index is (possibly strictly) higher than one or more enablement thresholds, the energy saving engine at block 452 adds the information category to the blocking condition of the corresponding energy saving levels in the energy saving policy of the mobile equipment; indeed, in this case it is likely that the transmission to the mobile equipment of inbound information belonging to the information category would involve a too high energy consumption for the mobile equipment in the corresponding status. The process then descends into block 454; the same point is also reached directly from the block 450 if the enablement index is (possibly strictly) lower than all the enablement thresholds. A test is now made, wherein the energy saving manager verifies whether all the information categories of the analytics data have been taken into account. If not, the process returns to the block 448 to repeat the same operations on a next information category of the analytics data. Conversely, the process descends into block 456, wherein the energy saving manager updates the energy saving policy of the mobile equipment according to its customization data (if any) retrieved from the corresponding entry of the mobile equipment repository. For example, the energy saving manager adds the information categories that are always to be blocked to and/or removes the information categories that are never to be blocked from the blocking list. In addition or in alternative, the energy saving manager updates the energy saving policy of the mobile equipment according to its feedback data (if any) retrieved from the corresponding entry of the mobile equipment repository. For example, the energy saving manager applies cognitive techniques in an attempt to make the energy saving policy more satisfactory for the user. The energy saving manager at block 458 saves the energy saving policy into the corresponding entry of the mobile equipment repository (possibly after requesting a confirmation to the user of the mobile equipment). A further test is made at block 460, wherein the energy saving manager verifies whether all the relevant mobile equipment have been taken into account. If not, the process returns to the block 444 to repeat the same operations on a next relevant mobile equipment. Conversely, the process returns to the block 442 waiting for a next event triggering the review of the energy saving policies.

Moving to the swim-lane of the mobile equipment, a loop is performed continuously to verify the status of the mobile equipment. For this purpose, the status monitor at block 462 measures the status parameters. The energy saving app at block 464 verifies the activation conditions of the energy saving levels (indicated in the configuration data repository) according to the status parameters (received from the status monitor), in order to determine the current mode of the mobile equipment (i.e., standard mode or energy saving mode at specific energy saving level). The flow of activity branches at block 466 according to a comparison between the current mode and a previous mode (saved in a corresponding working variable) of the mobile equipment. In a completely independent way, the user at block 468 may select a different mode of the mobile equipment manually (via the user interface of the energy saving app). The process then passes to block 470 from the block 466 when the mode of the mobile equipment has changed (possibly after a manual confirmation of the user) or in any case from the block 468. At this point, the energy saving app saves the (new) mode of the mobile equipment into the corresponding variable, and then notifies it to the network system (via the network drive). The process returns to the block 462 from the block 470 or directly from the block 466 when the mode of the mobile equipment has not changed to repeat the same operations continuously.

Moving to the swim-lane of the network system, the energy saving manager at block 472 receives (via the network drive) the new mode from any mobile equipment. In response thereto, the energy saving manager at block 474 saves the (new) mode of the mobile equipment into the corresponding entry of the mobile equipment repository and updates its log data accordingly (and possibly confirms the operation to the mobile equipment which provides a corresponding notification to its user). The flow of activity branches at block 476 according to the change of the mode of the mobile equipment. Particularly, if the mobile equipment has entered the energy saving mode, comprising when it has passed to a higher energy saving level thereof (meaning that more energy saving is required) the process returns to the block 472 waiting for the new mode from a further mobile equipment (without performing any action). Conversely, if the mobile equipment has exited the energy saving mode, comprising when it has passed to a lower energy saving level thereof (meaning that less energy saving is required) a loop is entered for processing the pieces of inbound information addressed to the mobile equipment (if any) which have been buffered in the corresponding entry of the mobile equipment repository. The loop begins at block 478 wherein the energy saving manager takes a current piece of (buffered) inbound information into account (starting from the oldest one). The energy saving manager at block 480 verifies the information category of the inbound information. If the information category is not listed in the blocking condition of the mode of the mobile equipment (always true when the mobile equipment is in the standard mode), meaning that the inbound information is not to be blocked any longer, the energy saving manager at block 482 transmits (via the network drive) the inbound information to the mobile equipment (for its processing as usual only at a later time) and removes the inbound information from the corresponding entry of the mobile equipment repository. The process then descends into block 484; the same point is also reached directly from the block 480 if the information category is listed in the blocking condition of the mode of the mobile equipment (meaning that the inbound information is still to be blocked). A test is now made to verify whether all the pieces of buffered inbound information have been taken into account. If not, the process returns to the block 478 to repeat the same operations on a next piece of buffered inbound information (in decreasing order of their age). Conversely, the process returns to the block 472 waiting for the new mode of another mobile equipment.

In a completely independent way, the process passes from block 486 to block 488 as soon as the switching engine receives a piece of inbound information to be transmitted to any mobile equipment. For this purpose, the switching engine passes the inbound information to the network drive for its transmission to the mobile equipment. However, in the solution according to an embodiment of the present invention, the inbound information is intercepted by the energy saving manager. The energy saving manager at block 490 determines the category parameters of the inbound information. The flow of activity then branches at block 492 according to the information category of the inbound information. If the information category is not listed in the blocking condition of the mode of the mobile equipment indicated in the corresponding entry of the mobile equipment repository (always true when the mobile equipment is in the standard mode), the energy saving manager at block 494 transmits (via the network drive) the inbound information to the mobile equipment (for its processing as usual). Conversely, the energy saving manager at block 496 buffers the inbound information into the corresponding entry of the mobile equipment repository (without transmitting it to the mobile equipment). In both cases, the process returns to the block 486 from the block 494 or the block 496 waiting for a next piece of inbound information.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, the terms "substantially", "about", "approximately" and the like should be understood as "within 10%". Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling an energy consumption of mobile equipment. However, the method may be used to control the energy consumption in any way (for example, to provide a moderate, high and/or very high energy saving, with or without any human intervention, and so on) of any number and type of mobile equipment (for example, smartphones, tablets, netbooks, Internet Of Things (TOT) devices and so on).

In an embodiment, the mobile equipment is adapted to communicate over a telecommunication network. However, the telecommunication network may be of any type (for example, a global, wide or local area network exploiting any wireless connections, such as mobile telephone connections conforming to the 3G, 4G and/or 5G standard, Wi-Fi and/or WMAX connections, satellite connections and so on).

In an embodiment, the method comprises entering (by a network system of the telecommunication network) an energy saving mode for a mobile equipment. However, the network system may be of any type (see below); moreover, the energy saving mode may be defined in any way (for example, a single one, with multiple energy saving levels, and so on) and it may be entered in any way (either completely from the standard mode or partially from a lower energy saving level).

In an embodiment, the energy saving mode is entered in response to an energy saving activation. However, the energy saving activation may be provided in any way (for example, received from the mobile equipment or generated by the network system, manually or automatically, with or without user's confirmation, and so on).

In an embodiment, the method comprises receiving (by the network system) inbound information to be transmitted to the mobile equipment in the energy saving mode. However, the inbound information may be of any type (for example, voice, messages, data or any combination thereof).

In an embodiment, the method comprises verifying (by the network system) a transmission enablement of the inbound information in response to said receiving the inbound information according to an energy saving policy. However, the energy saving policy may be defined in any way (for example, any blocking condition of the inbound information in terms of any information categories, any number of enablement thresholds for any number of enablement indexes, and so on) and it may be determined in any way (for example, according to energy consumption data, behavioral data, customization data, feedback data, any combination thereof, pre-defined, either the same for all the mobile equipment or specific for each mobile equipment, and so on).

In an embodiment, the energy saving policy is based on one or more category indicators of the inbound information. However, the category indicators may be in any number and of any type (for example, partial, different or additional category parameters, or any other indicators, with respect to the ones mentioned above) and they may be used to verify the transmission enablement in any way (for example, by verifying the inclusion of the information category of the inbound information in a blocking list, calculating the enablement index(es) and comparing with the enablement threshold(s), applying any rule based on the category indicators and so on).

In an embodiment, the method comprises controlling (by the network system) a transmission of the inbound information to the mobile equipment in the energy saving mode according to a result of said verifying the transmission enablement. However, the transmission of the inbound information may be controlled in any way (for example, by postponing the transmission, transmitting a corresponding notification only, passing to a less energy consuming connection, such as from 4G to 3G, and so on in case of negative result of the verification of the transmission enablement).

In an embodiment, the method comprises controlling (by the network system) the transmission of the inbound information to be enabled or postponed in response to a positive result or a negative result, respectively, of said verifying the transmission enablement. However, the transmission of the inbound information may be postponed in any way (for example, until the exit from the energy saving mode or at most with a maximum delay, as soon as a low energy-consuming connection, such as Bluetooth, is available, and so on).

In an embodiment, the method comprises buffering (by the network system) the inbound information in response to the negative result of said verifying the transmission enablement. However, the inbound information may be buffered in any way (for example, in a global memory structure common to all the mobile equipment, in separate memory structures each one dedicated to a corresponding mobile equipment, and so on).

In an embodiment, the method comprises exiting (by the network system) the energy saving mode for the mobile equipment in response to an energy saving deactivation. However, the energy saving mode may be exited in any way (either completely to the standard mode or partially to a lower energy saving level) in response to any energy saving deactivation (provided in either the same or different way with respect to the energy saving activation).

In an embodiment, the method comprises transmitting (by the network system) the inbound information which has been buffered to the mobile equipment in response to said exiting the energy saving mode. However, the buffered inbound information may be transmitted in any way (for example, indiscriminately, according to a manual selection following the transmission of a corresponding notification, and so on).

In an embodiment, the method comprises collecting (by the network system) energy consumption data. However, the energy consumption data may be collected in any way (for example, received from the mobile equipment, measured by the network system directly, with any fixed/variable frequency or continuously, and so on).

In an embodiment, the energy consumption data relate to an energy consumption impact on the mobile equipment of one or more communication events which have involved the transmission of information from the network system to the mobile equipment. However, the energy consumption data may relate to any number of mobile equipment (down to the corresponding one only) and they may be defined by any number and type of indicators (partial, different or additional indicators with respect to the ones mentioned above).

In an embodiment, the method comprises determining (by the network system) the energy saving policy according to the energy consumption data. However, the energy saving policy may be determined according to the energy consumption data in any way (for example, by updating/setting it with any technique, such as of analytics, cognitive, artificial intelligence, fuzzy-logic type, and so on).

In an embodiment, the method comprises collecting (by the network system) behavioral data. However, the behavioral data may be collected in any way (either the same or different with respect to the energy consumption data).

In an embodiment, the behavioral data relate to a behavior of a user of the mobile equipment with respect to one or more communication events which have involved the transmission of information from the network system to the mobile equipment. However, the behavioral data may relate to any number of mobile equipment (for example, additional mobile equipment up to all) and they may be defined by any number and type of indicators (partial, different or additional indicators with respect to the ones mentioned above).

In an embodiment, the method comprises determining (by the network system) the energy saving policy according to the behavioral data. However, the energy saving policy may be determined according to the behavioral data in any way (either the same or different with respect to the energy consumption data).

In an embodiment, the method comprises receiving (by the network system) customization data for the energy saving policy from the mobile equipment. However, the customization data may be of any type (for example, any number and type of information categories to be blocked always/never or under certain circumstances, values of the enablement thresholds, ways of calculating the enablement indexes, and so on).

In an embodiment, the method comprises determining (by the network system) the energy saving policy according to the customization data. However, the energy saving policy may be determined according to the customization data in any way (for example, by applying the indicated changes to the energy saving policy directly, by processing the customization data with any technique, such as of analytics, cognitive, artificial intelligence, fuzzy-logic type, and then using the result to update the energy saving policy, and so on).

In an embodiment, the method comprises transmitting (by the network system) an energy saving report based on said controlling the transmission of the inbound information to the mobile equipment. However, the energy saving report may be of any type (for example, indicating all the pieces of inbound information which have been blocked and/or transmitted, any statistics thereof, and so on) and it may be transmitted in any way (for example, with any fixed/variable frequency, upon request, and so on).

In an embodiment, the method comprises receiving (by the network system) feedback data relating to the energy saving report from the mobile equipment. However, the feedback data may be of any type (for example, any effectiveness indicator, any specification of undesired/desired energy saving activities and/or corrections to the energy saving policy, and so on) and they may be received in any way (for example, in push or pull mode).

In an embodiment, the method comprises updating (by the network system) the energy saving policy of the mobile equipment according to the feedback data. However, the energy saving policy may be updated according to the feedback data in any way (for example, by applying the required corrections directly to the energy saving policy, by processing the feedback data with any technique, such as of analytics, cognitive, artificial intelligence, fuzzy-logic type, and then using the result to update the energy saving policy, and so on).

In an embodiment, the method comprises receiving (by the mobile equipment) an activation/deactivation request of the energy saving mode that has been entered manually by a user of the mobile equipment. However, the activation/deactivation request may be of any type (for example, a generic activation request, a generic deactivation request, a specific change request to a selected energy saving level and so on) and it may be provided in any way (for example, with a soft-key, a hard-key, a menu selection and so on).

In an embodiment, the method comprises monitoring (by the mobile equipment) one or more status parameters relating to the mobile equipment. However, the status indicators may be in any number and of any type (for example, partial, different or additional status parameters, or any other indicators, with respect to the ones mentioned above) and they may be monitored in any way (for example, continuously with any frequency, in response to a generic activation request of the energy saving mode being entered manually to determine its energy saving level, and so on).

In an embodiment, the method comprises generating (by the mobile equipment) an activation/deactivation request of the energy saving mode according to the status indicators. However, the activation/deactivation request may be of any type (either the same or different with respect to above) and it may be generated in any way (for example, by comparing each status indicator with a corresponding threshold and then combining the results in any way, by calculating any function based on the status indicators and then comparing its value with a threshold, either in a fixed or customizable way, and so on).

In an embodiment, the method comprises transmitting (by the mobile equipment) the activation/deactivation request to the network system. However, the activation request may be transmitted in any way (for example, in push or pull mode).

In an embodiment, the method comprises transmitting (by the mobile equipment) the status indicators to the network system. However, the status indicators may be transmitted in any way (for example, individually or aggregated into one or more aggregated indicators, in push or pull mode, and so on).

In an embodiment, the method comprises generating (by the network system) an activation/deactivation request of the energy saving mode according to the status indicators. However, the activation/deactivation request may be of any type and it may be generated in any way (either the same or different with respect to above).

In an embodiment, the method comprises entering/exiting (by the network system) the energy saving mode for the mobile equipment in response to the activation/deactivation request. However, the energy saving mode may be entered/exited in any way in response to the activation/deactivation request (for example, by entering the energy saving mode at the lowest energy saving level, exiting the energy saving mode passing to the standard mode, passing to the immediately higher/lower energy saving level, passing to the specified energy saving level, and so on).

In an embodiment, the category indicators are indicative of voice, message and/or data. However, the category indicators may be in any number, down to a single one, and of any type for each of these information categories (for example, partial, different or additional category parameters, or any other indicators, with respect to the ones mentioned above).

In an embodiment, the energy saving mode comprises a plurality of energy saving levels. However, the energy saving levels may be in any number and of any type (for example, discrete or continuous ones, distributed either uniformly or not, and so on).

In an embodiment, the energy saving policy depends on the energy saving levels. However, the energy saving policy may depend on the energy saving levels in any way (for example, by providing corresponding blocking lists, which may be either independent or incremental with the addition of further information categories to be blocked as the energy saving levels increase, corresponding enablement thresholds for the enablement indexes, and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program which is configured for causing a network system to perform the above-mentioned method. An embodiment provides a computer program product for controlling an energy consumption of mobile equipment (adapted to communicate over a telecommunication network). The computer program product comprises a computer readable storage medium that has program instructions embodied therewith. The program instructions are executable by a network system of the telecommunication network to cause the network system to perform the above-mentioned method. However, the software program may be implemented as a stand-alone module, as a plug-in for a pre-existing software program (for example, a switching manager), or even directly in the latter; it would be readily apparent that it is also possible to deploy the same solution as a service that is accessed via the telecommunication network (such as in the Internet). Moreover, the programs may be executed on any network system (see below), either completely or with one or more operations that are distributed to the mobile equipment. In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of the above-described method. An embodiment provides a system comprising a circuit (i.e., any hardware suitably configured, for example, by software) for performing each of the steps of the same method. However, the system may be of any type (for example, the network system alone or the network system with the mobile equipment) and it may be implemented in any way (for example, with the network system comprising any number and type of physical/virtual computing machines).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device which can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood which each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such which the instructions, which execute via the processor of the computer or other programmable data processing apparatus, create means for implementing the functions/acts specified in the flowchart and/or block diagram block or blocks. These computer readable program instructions may also be stored in a computer readable storage medium which can direct a computer, a programmable data processing apparatus, and/or other devices to function in a particular manner, such which the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such which the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted which each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
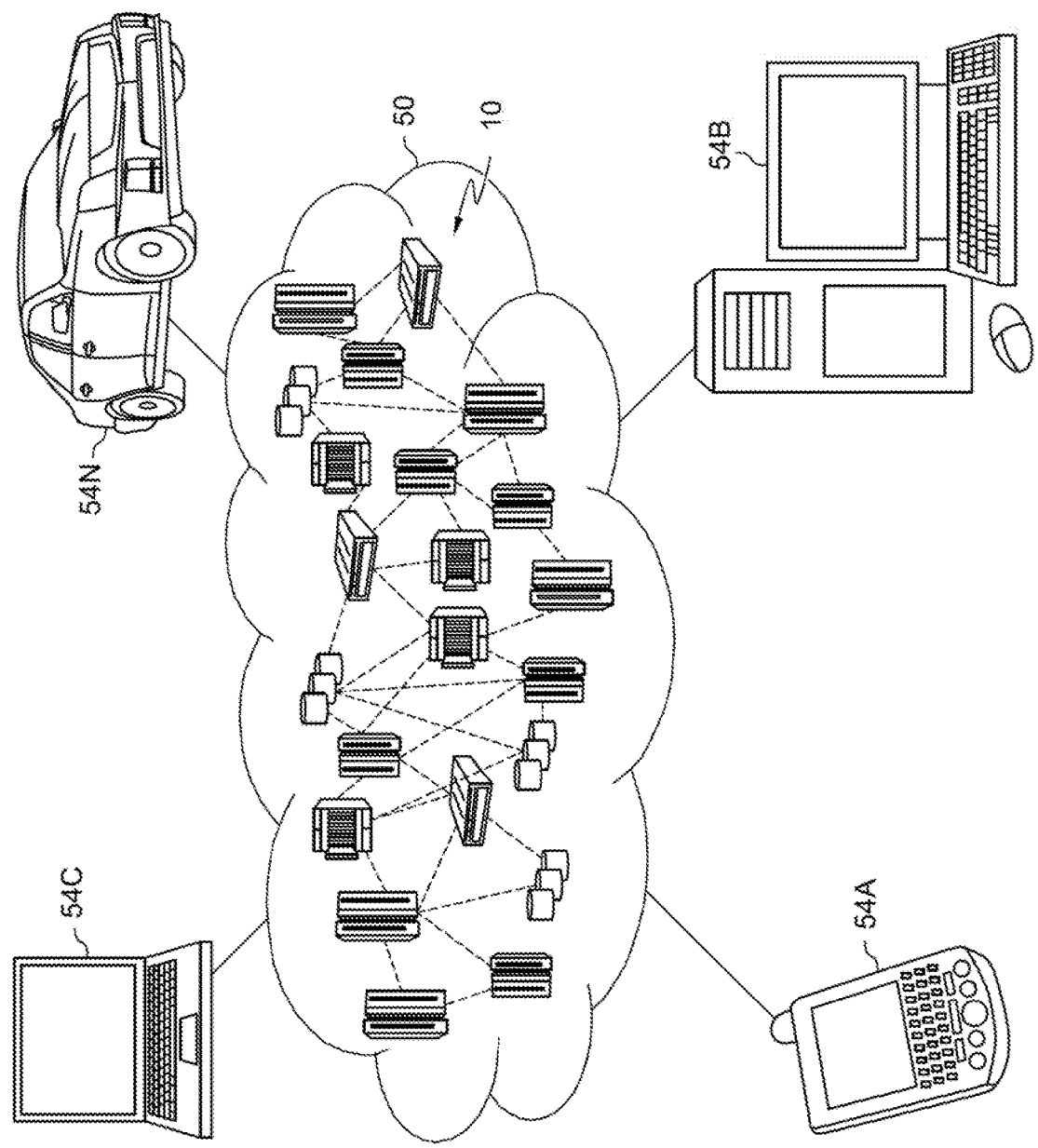
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
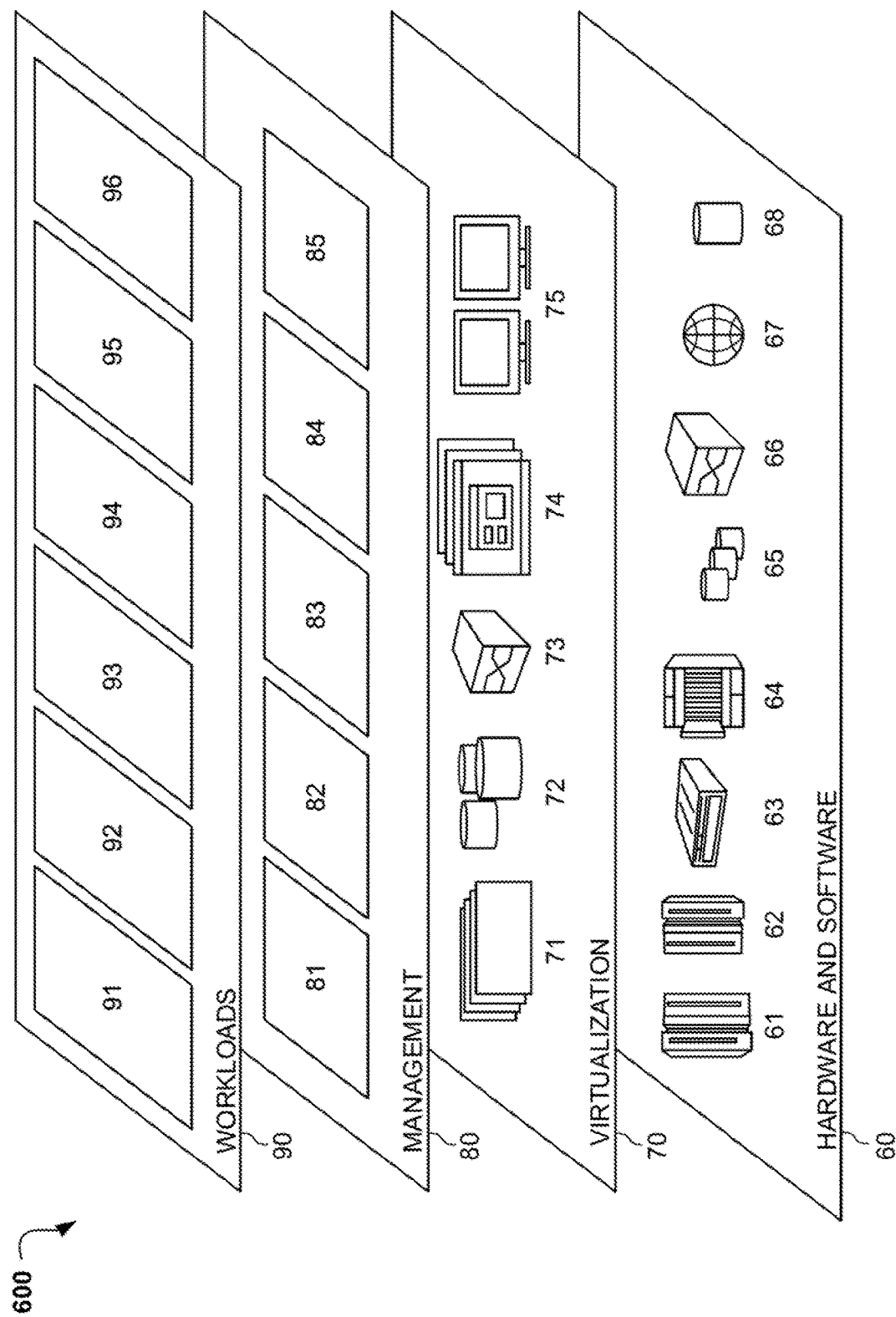
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile devices energy consumption saving 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling energy consumption of mobile equipment for communication over a telecommunication network, wherein the method comprises:
   entering, by a network system of the telecommunication network, an energy saving mode for mobile equipment in response to an energy saving activation;
   receiving, by the network system, inbound information to be transmitted to the mobile equipment in the energy saving mode;
   verifying, by the network system, a transmission enablement of the inbound information in response to receiving the inbound information according to an energy saving policy based on one or more category indicators of the inbound information;
   controlling, by the network system, a transmission of the inbound information to the mobile equipment in the energy saving mode according to a result of verifying the transmission enablement;
   buffering, by the network system, the inbound information in response to the negative result of verifying the transmission enablement;
   exiting, by the network system, the energy saving mode for the mobile equipment in response to an energy saving deactivation; and
   transmitting, by the network system, the inbound information being buffered to the mobile equipment in response to said exiting the energy saving mode.

2. The method according to claim 1, wherein the method comprises:
   controlling, by the network system, the transmission of the inbound information to be enabled or postponed in response to a positive result or a negative result, respectively, of verifying the transmission enablement.

3. The method according to claim 1, wherein the method comprises:
   collecting, by the network system, energy consumption data relating to an energy consumption impact on the mobile equipment of one or more communication events having involved the transmission of information from the network system to the mobile equipment; and
   determining, by the network system, the energy saving policy according to the energy consumption data.

4. The method according to claim 1, wherein the method comprises:
   collecting, by the network system, behavioral data relating to a behavior of a user of the mobile equipment with respect to one or more communication events having involved the transmission of information from the network system to the mobile equipment; and
   determining, by the network system, the energy saving policy according to the behavioral data.

5. The method according to claim 1, wherein the method comprises:
   receiving, by the network system, customization data for the energy saving policy from the mobile equipment; and determining, by the network system, the energy saving policy according to the customization data.

6. The method according to claim 1, wherein the method comprises:
transmitting, by the network system, an energy saving report based on said controlling the transmission of the inbound information to the mobile equipment;
receiving, by the network system, feedback data relating to the energy saving report from the mobile equipment; and
updating, by the network system, the energy saving policy of the mobile equipment according to the feedback data.

7. The method according to claim 1, wherein the method comprises:
receiving, by the mobile equipment, an activation or deactivation request of the energy saving mode being entered manually by a user of the mobile equipment;
transmitting, by the mobile equipment, the activation or deactivation request to the network system; and
entering or exiting, by the network system, the energy saving mode for the mobile equipment in response to the activation or deactivation request.

8. The method according to claim 1, wherein the method comprises:
monitoring, by the mobile equipment, one or more status indicators relating to the mobile equipment and one or more status parameters, wherein one or more status parameters comprise battery level, outside temperature, time, date and geographical zone;
generating, by the mobile equipment, an activation or deactivation request of the energy saving mode according to the status indicators;
transmitting, by the mobile equipment, the activation or deactivation request to the network system; and
entering or exiting, by the network system, the energy saving mode for the mobile equipment in response to the activation/deactivation request.

9. The method according to claim 1, wherein the method comprises:
monitoring, by the mobile equipment, one or more status indicators relating to the mobile equipment and one or more status parameters, wherein one or more status parameters comprise battery level, outside temperature, time, date and geographical zone;
transmitting, by the mobile equipment, the status indicators to the network system;
generating, by the network system, an activation or deactivation request of the energy saving mode according to the status indicators; and
entering or exiting, by the network system, the energy saving mode for the mobile equipment in response to the activation/deactivation request.

10. The method according to claim 1, wherein the category indicators are indicative of voice, message or data.

11. The method according to claim 1, wherein the energy saving mode comprises a plurality of energy saving levels, the energy saving policy depending on the energy saving levels.

12. A computer program product for controlling energy consumption of mobile equipment for communication over a telecommunication network, the computer program product comprising a non-transitory computer readable storage medium having program instructions embodied therewith, the program instructions executable by a network system of the telecommunication network to cause the network system to perform a method comprising:
entering an energy saving mode for mobile equipment in response to an energy saving activation;
receiving inbound information to be transmitted to the mobile equipment in the energy saving mode;
verifying a transmission enablement of the inbound information in response to receiving the inbound information according to an energy saving policy based on one or more category indicators of the inbound information;
controlling, by the network system, a transmission of the inbound information to the mobile equipment in the energy saving mode according to a result of verifying the transmission enablement;
buffering, by the network system, the inbound information in response to the negative result of verifying the transmission enablement;
exiting, by the network system, the energy saving mode for the mobile equipment in response to an energy saving deactivation; and
transmitting, by the network system, the inbound information being buffered to the mobile equipment in response to said exiting the energy saving mode.

13. The computer program product according to claim 12, wherein the computer program product comprises:
controlling the transmission of the inbound information to be enabled or postponed in response to a positive result or a negative result, respectively, of verifying the transmission enablement.

14. The computer program product according to claim 12, wherein the computer program product comprises:
collecting energy consumption data relating to an energy consumption impact on the mobile equipment of one or more communication events having involved the transmission of information from the network system to the mobile equipment; and
determining the energy saving policy according to the energy consumption data.

15. The computer program product according to claim 12, wherein the computer program product comprises:
collecting behavioral data relating to a behavior of a user of the mobile equipment with respect to one or more communication events having involved the transmission of information from the network system to the mobile equipment; and
determining the energy saving policy according to the behavioral data.

16. The computer program product according to claim 12, wherein the computer program product comprises:
receiving customization data for the energy saving policy from the mobile equipment; and
determining the energy saving policy according to the customization data.

17. The computer program product according to claim 12, wherein the computer program product comprises:
transmitting an energy saving report based on said controlling the transmission of the inbound information to the mobile equipment;
receiving feedback data relating to the energy saving report from the mobile equipment; and
updating the energy saving policy of the mobile equipment according to the feedback data.

18. A network system of a telecommunication network for controlling an energy consumption of mobile equipment for communication over the telecommunication network, wherein the network system comprises:
a circuit for entering an energy saving mode for mobile equipment in response to an energy saving activation;

a circuit for receiving inbound information to be transmitted to the mobile equipment in the energy saving mode;

a circuit for verifying a transmission enablement of the inbound information in response to receiving the inbound information according to an energy saving policy based on one or more category indicators of the inbound information;

a circuit for controlling a transmission of the inbound information to the mobile equipment in the energy saving mode according to a result of verifying the transmission enablement;

a circuit for buffering the inbound information in response to the negative result of verifying the transmission enablement;

a circuit for exiting the energy saving mode for the mobile equipment in response to an energy saving deactivation; and a circuit for transmitting the inbound information being buffered to the mobile equipment in response to said exiting the energy saving mode.

* * * * *